United States Patent
Stiehler et al.

[11] Patent Number: 5,845,168
[45] Date of Patent: Dec. 1, 1998

[54] CARTRIDGE HANDLING SYSTEM FOR CAMERA

[76] Inventors: Wayne Edward Stiehler; Robert Louis Kuhn, Jr.; Thomas Samuel Albrecht, all of Eastman Kodak Company, Rochester, N.Y. 14650

[21] Appl. No.: 918,161

[22] Filed: Aug. 25, 1997

Related U.S. Application Data

[62] Division of Ser. No. 565,463, Nov. 30, 1995, Pat. No. 5,737,659.

[60] Provisional application No. 60/000,713 Jun. 29, 1995.

[51] Int. Cl.⁶ ............................ G03B 17/26; G03B 17/02
[52] U.S. Cl. ......................... 396/512; 396/513; 396/536; 396/538
[58] Field of Search ..................... 396/511, 512, 396/513, 514, 515, 516, 518, 522, 535, 536, 538

[56] References Cited

U.S. PATENT DOCUMENTS

| | | | |
|---|---|---|---|
| 3,259,410 | 7/1966 | Neudecker et al. | 292/67 |
| 3,938,170 | 2/1976 | Winkler et al. | 396/348 |
| 4,214,830 | 7/1980 | Schroder | 396/539 |
| 5,155,514 | 10/1992 | Tamamura | 396/360 |
| 5,159,365 | 10/1992 | Takahashi et al. | 396/285 |
| 5,231,438 | 7/1993 | Smart | 396/522 |
| 5,319,406 | 6/1994 | Takatori | 396/513 |
| 5,323,201 | 6/1994 | Richiuso et al. | 396/536 |
| 5,357,303 | 10/1994 | Wirt | 396/513 |
| 5,359,378 | 10/1994 | Zander et al. | 396/513 |
| 5,363,166 | 11/1994 | Takahashi et al. | 396/513 |
| 5,452,036 | 9/1995 | Kamata et al. | 396/512 |
| 5,530,504 | 6/1996 | Fuss et al. | 396/538 |
| 5,530,508 | 6/1996 | Fuss et al. | 396/538 |
| 5,563,672 | 10/1996 | Fuss et al. | 396/512 |
| 5,600,393 | 2/1997 | Funahashi | 396/538 |
| 5,630,192 | 5/1997 | Kobayashi | 396/513 |
| 5,708,899 | 1/1998 | O'Leary et al. | 396/536 |

*Primary Examiner*—Eddie C. Lee
*Attorney, Agent, or Firm*—Gordon M. Stewart; Charles E. Snee, III

[57] ABSTRACT

A camera includes a chamber for receiving a film cartridge having a light-lock movable between open and closed positions, a chamber cover movable between a closed position covering the chamber and an open position uncovering the chamber, and manually operable means for releasing the chamber cover to move from its closed position to its open position. An ejector is provided for ejecting the film cartridge at least part way out of the chamber. An actuating member is sized and positioned such that it can be moved by the releasing means to both actuate the ejector to eject the cartridge from the chamber, and move the light-lock from its open to closed position.

4 Claims, 8 Drawing Sheets

CARTRIDGE HANDLING SYSTEM FOR CAMERA

CROSS-REFERENCE TO RELATED APPLICATIONS

This application is a divisional of Ser. No. 08/565,463, filed Nov. 30, 1995, now U.S. Pat. No. 5,737,659, which is a provisional application Ser. No. 60/000713 filed Jun. 29, 1995. Reference is also made to a second divisional application Ser. No. 08/918,240, entitled Cartridge Handling System For A Camera, filed on even date herewith in the names of Stiehler et al.

Reference is made to commonly assigned application Ser. Nos. 08/445,349, filed May 19, 1995 and entitled Film Cartridge Ejector for Photographic System, now U.S. Pat. No. 5,530,504; 60/000,678 filed Jun. 29, 1995 and entitled Photographic System Film Door Locking Mechanism and Method, now Ser. No. 08/568,110 filed Dec. 6, 1995, now U.S. Pat. No. 5,717,971 and 60/000,655 filed Jun. 29, 1995 and entitled Camera With Means For Preventing a Cartridge Light Lock From Moving From An Open To a Closed Position When a Filmstrip Protrudes Out of the Cartridge, now Ser. No. 08/568,214 filed Dec. 6, 1995, now U.S. Pat. No. 5,713,057.

FIELD OF THE INVENTION

The invention relates generally to the field of photography, and in particular to cameras. More specifically, the invention relates to a cartridge handling system for a camera.

BACKGROUND OF THE INVENTION

Film cartridges loaded into cameras are often mechanically held within a chamber to insure the film cartridge does not fall out of the camera inadvertently. This is particularly true with bottom-loading cameras. A problem that can occur with such bottom-loading cameras is that after a film cartridge has been loaded in the camera, a user may decide to load a different film cartridge rather than use the one just loaded. However, the already-loaded film cartridge typically cannot be unloaded without closing the chamber door and cycling the film through the camera. In some cameras, the camera operator might even be required to expose some film before being able to rewind and unload the undesired film cartridge. Therefore, it is desirable to have the ability to eject a film cartridge from a bottom or top loading camera (axial load) prior to camera initialization or closing of the chamber door.

The door release of a camera typically opens a latch or otherwise allows a chamber door to open so that a film cartridge can be loaded or unloaded from the camera. Cameras can have several different mechanisms, such as camera initialization, whose operation is related to the closing of the chamber door. For example, some film cartridges include a light-lock door which when closed prevents inappropriate exposure of unexposed film. After a film cartridge has been loaded into a camera and the film door is closed, the camera needs to open the light lock door before film can be thrust from the film cartridge. When the user decides to rewind the film and eject the film cartridge, the camera must close the light lock door prior to opening the film door.(see e.g. U.S. Pat. No. 5,231,438 which is incorporated herein by reference (the '438 patent)).

A camera light lock drive mechanism opens and closes the light lock door. The light lock drive mechanism could include gears, but they do not lend themselves to intermittent motion and, in addition, are relatively complex to design and manufacture. It is therefore desirable to have a light lock drive mechanism that requires less design cost and is less complex, thus providing a higher reliability, lower cost camera to the user.

Another mechanism related to the chamber door is a film cartridge ejector for ejecting a film cartridge from the camera chamber. One method of cartridge ejection, disclosed in the above-cited cross-referenced U.S. Pat. No. 5,530,504, uses an independent trigger mechanism that initiates cartridge ejection when the film door is opened. This cartridge ejection trigger method however places large forces upon the film door, causing many mechanical and operational problems including difficulty in closing the film door and warping the film door.

In an effort to reduce the forces applied to the film door and also to reduce the parts count in a camera, it would be desirable to operate the cartridge light-lock door and cartridge ejection trigger with mechanisms that do not involve the film door.

SUMMARY OF THE INVENTION

The present invention is directed to overcoming one or more of the problems set forth above. Briefly summarized, according to one aspect of the present invention, a camera includes a chamber for receiving a film cartridge having a light-lock movable between open and closed positions, a chamber cover movable between a closed position covering the chamber and an open position uncovering the chamber, and manually operable means for releasing the chamber door to move from its closed position to its open position. An ejector is provided for ejecting the film cartridge at least part way out of said chamber. An actuating member is sized and positioned such that it can be moved by the releasing means to both actuate the ejector to eject the cartridge from the chamber, and move the light-lock door from its open to closed position.

By operating the cartridge light-lock door and cartridge ejection trigger with mechanisms that do not involve the film door, a reduction is gained in the forces applied to the film door as well as the parts count in the camera.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
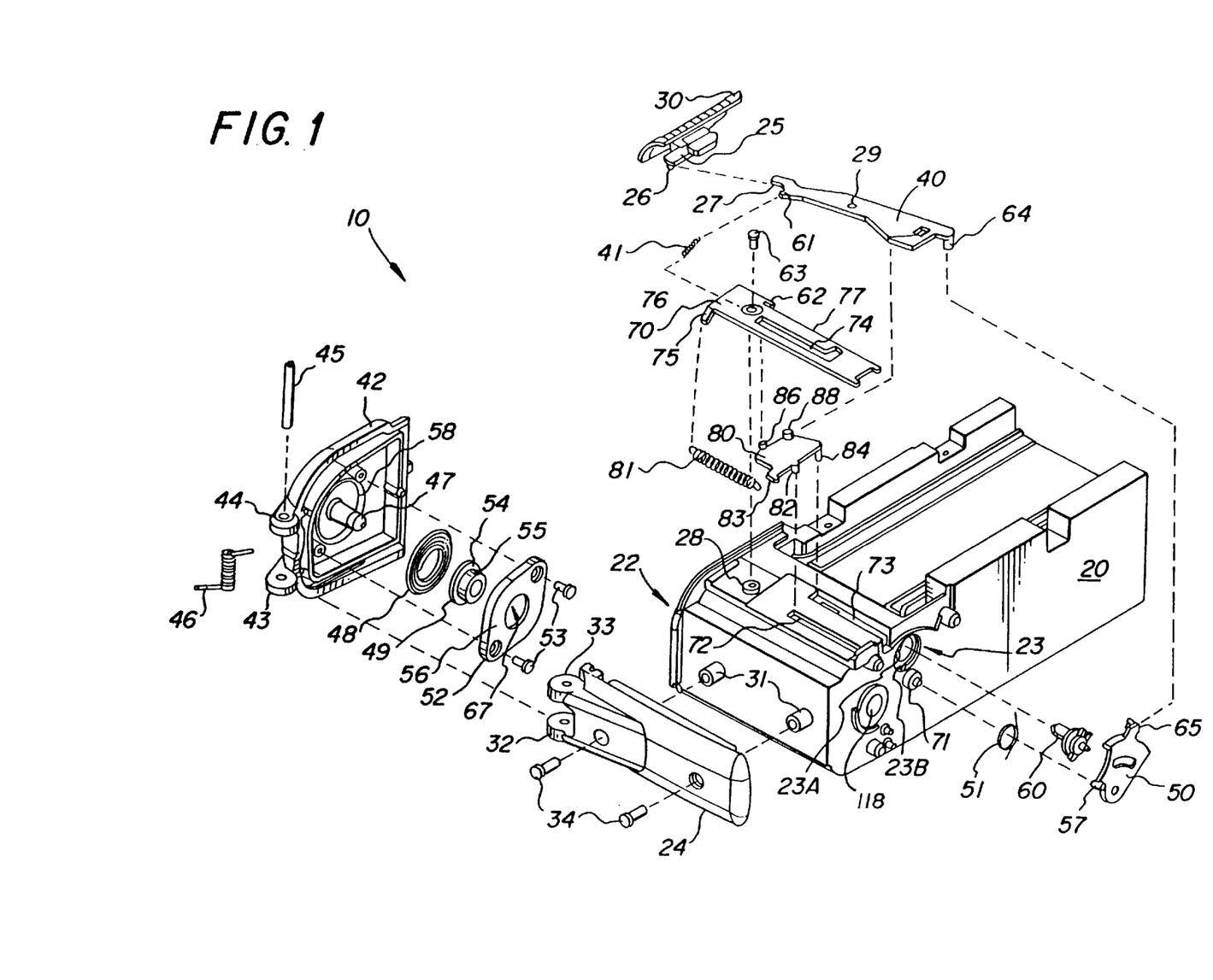
FIG. 1 is an exploded perspective view of a camera including the present invention.

FIG. 1 shows an exploded perspective view of a camera 10 having a body 20. A film chamber 22 holds a film cartridge when it is loaded in camera 10. A hinge 24 is attached to one end of body 20 at holes 31 by a pair of fasteners 34. The hinge includes a pair of hinge arms 32, 33. A film door (chamber cover) 42, movable between a closed position covering the chamber and an open position uncovering the chamber, includes first and second film door arms 43, 44 which engage first and second hinge arms 32, 33 when assembled. A film door pin 45 passes through these arms 32, 33, 43, 44 to hold film door 42 to hinge 24. Film door pin 45 also captures a film door spring 46 which urges film door 42 toward an open position. Film door 42 also includes a spool engaging post 47 which engages a spool in a film cartridge loaded in chamber 22.

A conical spring 48, which has the shape of a truncated cone, and a bushing 49, which is basically T-shaped, are mounted on post 47 and held against film door 42 by a retainer 52. Retainer 52 is secured to door 42 by a pair of fasteners 53. Bushing 49 includes a bushing flange 54 which has a larger outer diameter than a bushing barrel 55. Barrel 55 engages a spool end of a film cartridge loaded in chamber 22, when door 42 is closed, to properly position the spool. Retainer 52 includes a retainer face 56 and a retainer aperture 67 which is large enough to receive barrel 55 but smaller than bushing flange 54. Retainer face 56 pushes against a shell of a film cartridge which is partially loaded into chamber 22 as door 42 is closed to further move the cartridge into the chamber. A spring retaining lip 58 in door 42 helps position conical spring 48 when installed.

When assembled, the larger end of conical spring 48 is seated against film door 42 inside spring retaining lip 58. Bushing flange 54 presses against the smaller end of conical spring 48, and bushing barrel 55 protrudes through retainer aperture 67 in retainer 52. Thus, retainer 52, when attached to film door 42, holds conical spring 48 and bushing 49 in movable position around spool engaging post 47.

Body 20 includes a first aperture 23 which receives a light-lock drive spindle 60. Spindle 60 engages a light-lock door (light-lock) of a film cartridge loaded in chamber 22 and rotates the light-lock door between an open and closed position. Spindle 60 is rotated by a light lock drive sector (member) 50 (described in more detail below) which is rotatably mounted to a post 71. Drive sector 50 is urged to rotate clockwise about post 71 by a spring 51 which is mounted about post 71. Also included in body 20 are first and second ejector guide channels 72 and 73 respectively. A mount 28 for a cover plate fastener is also shown on body 20.

A manually operable door release 30 for releasing the chamber cover to move from its closed position to its open position includes an arm 25 at one end of which is located a pin 26. A lever (actuating member) 40 includes a pin engaging surface 27 for engaging pin 26. Lever 40 is secured to camera body 20 at a lever pivot 29 by a fastener (not shown). One end of a lever spring 41 is secured to a lever spring retainer 61 on lever 40. The other end of spring 41 is secured to a spring catch 62 on a retainer plate 70 which is mounted to mount 28 by a fastener 63. Therefore, spring 41 urges lever 40 to rotate counter-clockwise about pivot 29, causing surface 27 to press against pin 26. A pawl 64 located at one end of lever 40 engages a lever engaging surface 65 on drive sector 50 for rotating the spindle 60 counter-clockwise against the force of spring 51. An ejector engaging surface 104 pushes on ejector pin 88 of ejector 80 to trip the cartridge ejection mechanism. Lever 40 thus performs multiple tasks including triggering the ejector, causing movement of the cartridge light lock and returning door release 30 to a latched position. The use of a single lever to perform these tasks simplifies the timing of the tasks.

Generally, the ejector mechanism includes cover plate 70 which has an L-shaped third ejector guide channel 74, a first ejector spring retainer 75 and a mounting aperture 76. An ejector 80 includes four ejector pins 82, 84, 86 and 88 respectively, and a second ejector spring retainer 83. When assembled, first ejector pin 82 is located in second ejector guide channel 72 and second ejector pin 84 is located in first ejector guide channel 73. Pin 84 is engaged by the bottom of a film cartridge inserted into chamber 22. Ejector pin 86 rides within third ejector guide channel 74 and ejector pin 88 is adjacent to an outside edge 77 of cover plate 70. A fastener 63 secures cover plate 70 to camera body 20 at mount 28, capturing ejector 80 therebetween. Opposite ends of ejector spring 81 are respectively secured to first ejector spring retainer 75 and second ejector spring retainer 83, urging ejector 80 toward the long end of the L-shaped third ejector guide channel 74.

Figure 2:
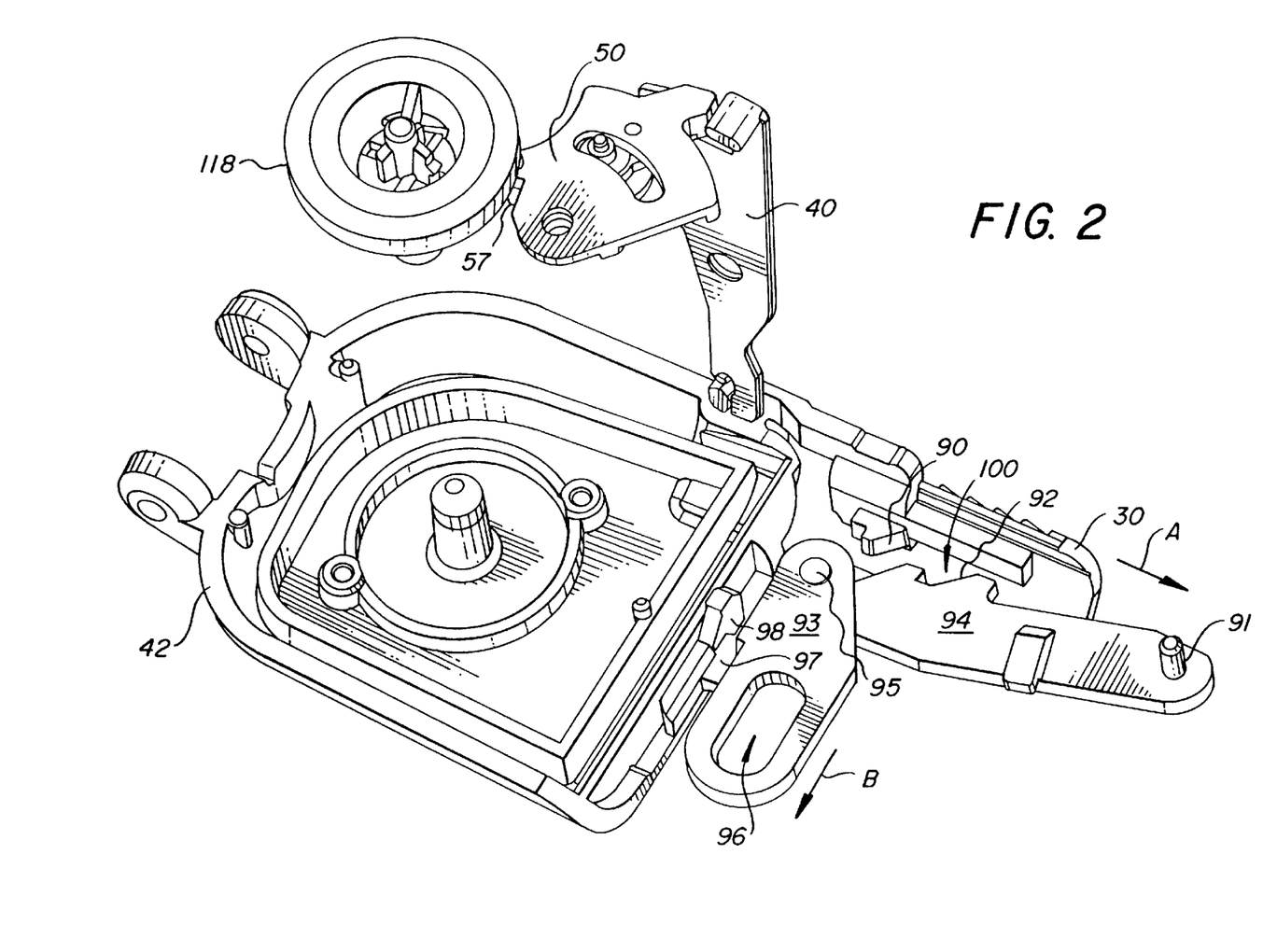
FIG. 2 is an assembled, perspective view of a portion of the camera of FIG. 1.
Figure 3:
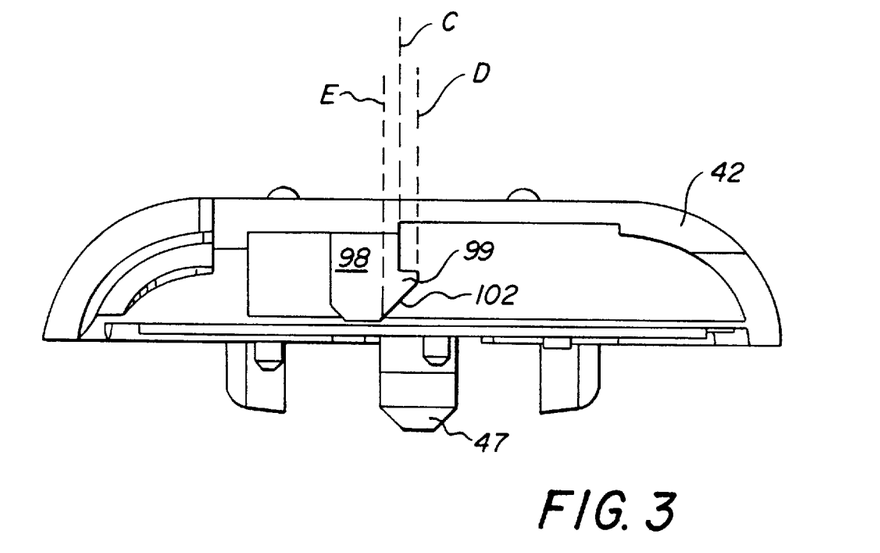
FIG. 3 is an end view of a cover for a camera cartridge chamber.

Referring now to FIGS. 2 and 3, a description is provided of the mechanism for unlatching door 42 such that it can move towards its open position under the influence of spring 46. Door 42 is shown in a closed position in which door release 30 partially covers door 42 to assist in holding the door closed (see FIG. 7). Door release 30 includes a cam portion 90. A detent lever 94 is rotatably mounted to the camera body at a pivot 91. A spring (not shown) biases lever 94 in a clockwise direction about pivot 91. Lever 94 includes a cam surface 92. A latch plate (member) 93 is pivotally attached to lever 94 by a fastener 95. A post (not shown) secured to the camera body extends into an aperture 96 in plate 93 to guide movement of the plate. A portion 97 of latch plate 93 engages a catch 98 on door 42 to secure the door closed. In the latched position, portion 97 of latch plate 93 engages catch 98 in a latch position shown by a dotted line C in FIG. 3.

Figure 7:
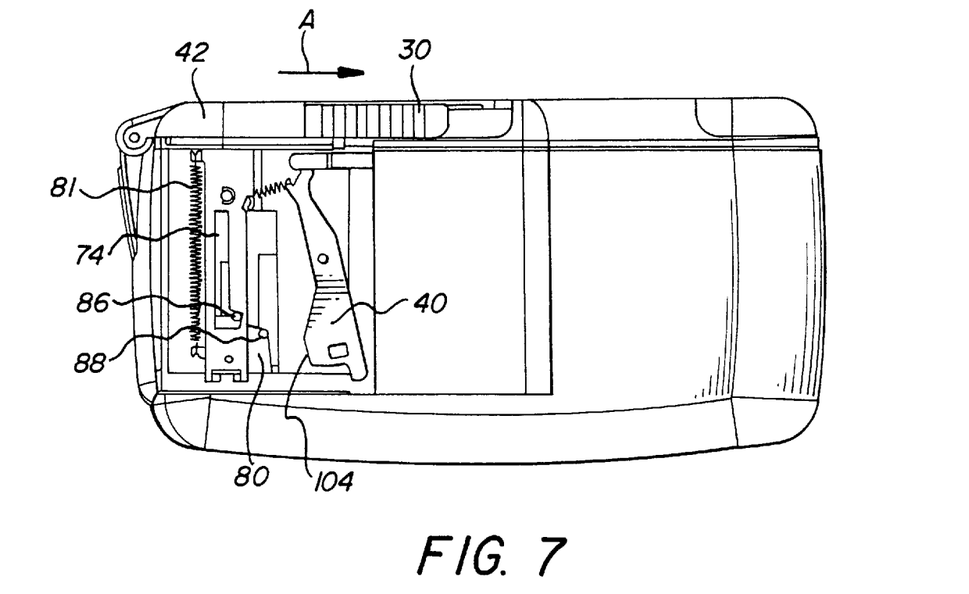

When a camera operator desires to open door 42, the operator manually moves door release 30 in the direction of an arrow A (see also FIG. 7). Such movement causes cam portion 90 to engage cam surface 92, thereby rotating lever 94 counter-clockwise about pivot 91. Rotation of lever 94 causes latch plate 93 to move in the direction of an arrow B. As plate 93 moves, portion 97 of the latch plate moves from latch position C to an unlatch position D represented by dotted lines (FIG. 3) to disengage a lip 99 of catch 98 from portion 97, thereby releasing door 42 to open.

When the camera operator releases door release 30, the door release is moved in a direction opposite to arrow A under the influence of spring 41 (see FIG. 1). As a result, lever 94 is allowed to rotate clockwise about pivot 91 under the influence of its spring. Rotation of lever 94 causes the latch plate 93 to move in a direction opposite to arrow B.. Thus, cam portion 90 engages a notch 100 in lever 94, preventing door release 30 from moving further to the left (opposite A). The door release ends up in an intermediate detent position depicted in FIG. 4 in which door 42 can be closed without interference from door release 30. Also, portion 97 of latch plate 93 has been moved from the unlatch position D to a detent position E represented by dotted lines (FIG. 3).

When a camera operator moves door 42 towards a closed position, a cam surface 102 (FIG. 3) engages portion 97 of latch plate 93, thereby forcing portion 97, thus latch plate 93, to move from detent position E to unlatch position D. With further closure of door 42, portion 97 bypasses lip 99 and then moves from unlatch position D to latch position C under the influence of the spring which biases lever 94 clockwise about pivot 91, thereby securing the door closed. While portion 97 is being moved from position E to D, lever 94, thus notch 100, is being withdrawn from cam portion 90 of door release 30. When portion 97 reaches position D, notch 100 has been completely withdrawn from cam portion 90, thereby allowing door release 30 to move in the direction opposite to arrow A under the influence of spring 41. Such movement of door release 30 causes the door release to return to its original position, partially covering door 42 to assist in securing door 42 closed (FIG. 7).

Figure 4:
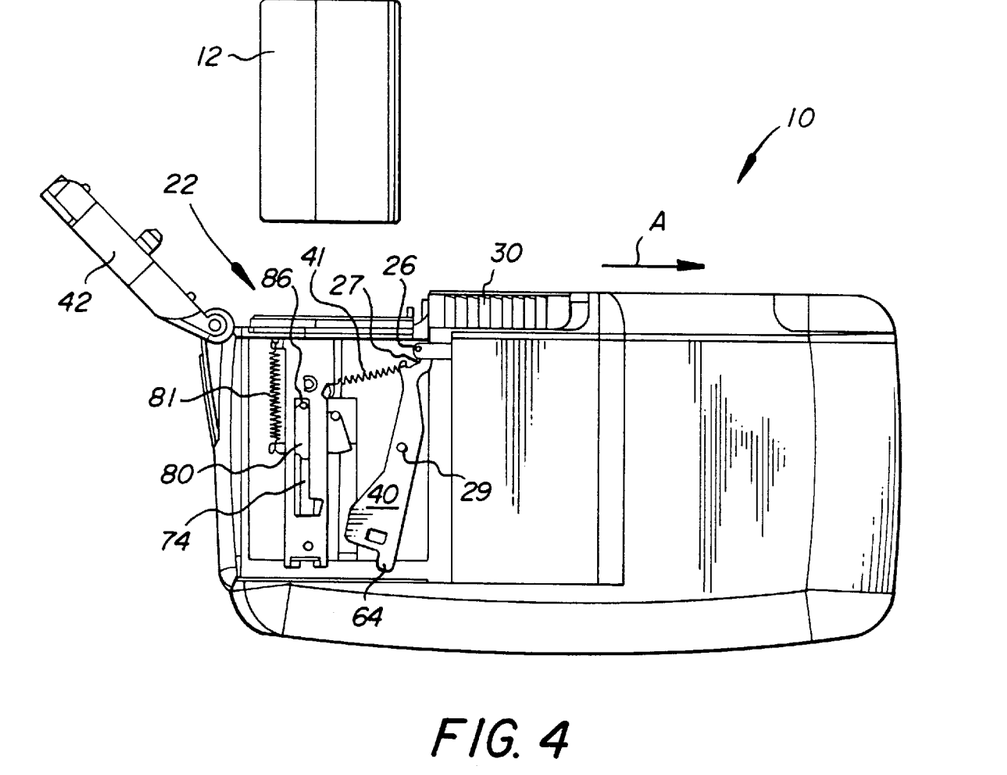
FIGS. 4–8 are schematic, assembled side views of the camera of FIG. 1 during various stages of film cartridge loading.

Referring to FIGS. 4–8, operation of cartridge loading, unloading, and the cartridge ejector will be explained. FIG. 4 shows loading chamber 22 about to be loaded with a film cartridge 12. Cartridge 12 is similar to the film cartridge disclosed in U.S. Pat. No. 5,231,438 which is incorporated herein by reference. Generally, the steps to loading film cartridge 12 into loading chamber 22 can be summarized as (1) opening film door 42; (2) loading film cartridge 12; (3) closing film door 42; and (4) opening a cartridge light-lock door.

When the user desires to open the camera film door to load a film cartridge 12, the user moves door release 30 in the direction of arrow A from a latched (closed) first position (FIG. 7) towards an unlatched (open) second position at which the film door 42 is released to open. First pin 26 of door release 30 engages first pin engaging surface 27 of lever 40. Movement of door release 30 from the first position towards the second position causes lever 40 to rotate clockwise about lever pivot 29 in opposition to the force from spring 41. As lever 40 rotates, pawl 64 rotates drive sector 50, which in turn causes spindle 60 to rotate to a light lock closed position. The user now lets go of door release 30, and lever spring 41 urges lever 40 and door release 30 to an intermediate detent (fourth) position (FIG. 4) part way between the unlatched (open) position and the latched (closed) position (described above).

After the film cartridge 12 has been loaded into loading chamber 22 by the user, the user rotates the film door 42 towards a closed position. As the film door 42 closes, it causes the door release 30 to be moved from its intermediate detent position to the unlatched (open) position and then returns to the latched (closed) position partially covering door 42 when the film door is completely closed (described above). Movement of release 30 from the unlatched position to the latched position allows lever 40 to rotate counter-clockwise, thereby allowing drive sector 50 (FIG. 1) to rotate clockwise. Rotation of drive sector 50 rotates spindle 60 clockwise (described in detail below) to open the light lock on the film cartridge.

With reference to FIG. 4, operation of the cartridge ejector will be described. Notice that as the user is about to load a film cartridge 12 into loading chamber 22, film door 42 is open, door release 30 is in a detent position and ejector 80 has been pulled near the long end of L-shaped third ejector guide channel 74 by ejector spring 81. Ejector spring 81 causes ejector 80 to pivot about first ejector pin 82 (hidden from view) so that third ejector pin 86 engages the right side of third ejector guide channel 74. First pin 26 of door release 30 has rotated lever 40 to an intermediate position.

Figure 5:
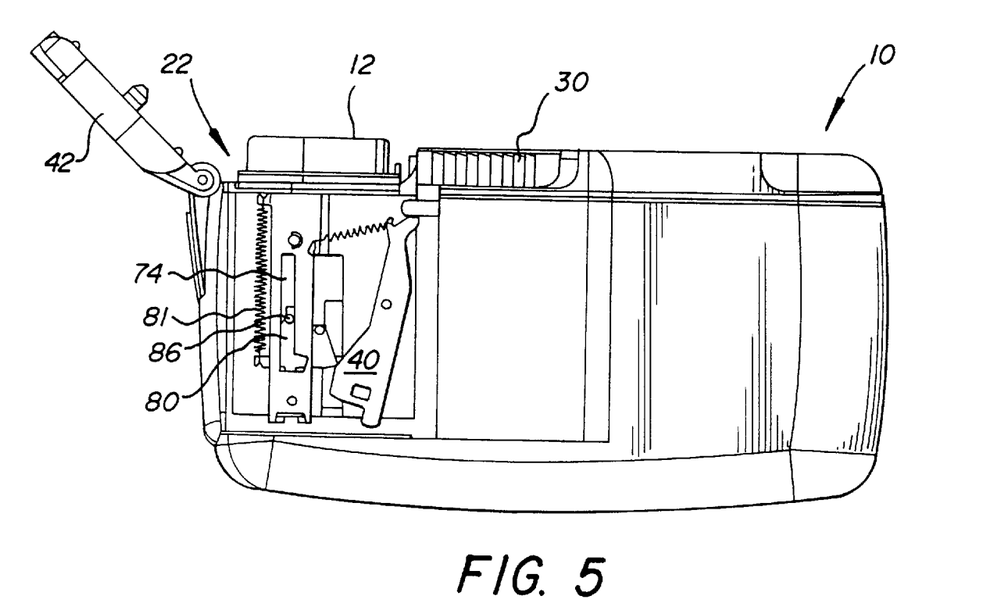

FIG. 5 shows film cartridge 12 partially loaded into loading chamber 22. As film cartridge 12 moves into the loading chamber, it engages second ejector pin 84 (hidden from view). As the user pushes film cartridge 12 further into loading chamber 22, ejector 80 is pushed along third ejector guide channel 74. Ejector spring 81 maintains a clockwise rotational force on ejector 80, thus causing third ejector pin 86 to remain in contact with the right side of third guide channel 74.

Figure 6:
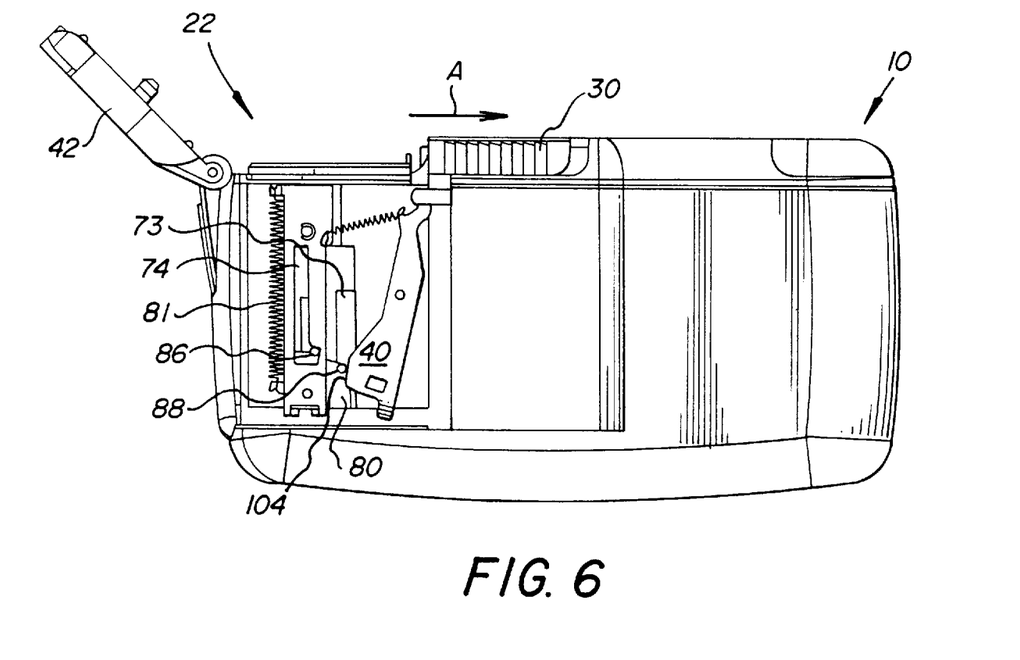

FIG. 6 shows the film cartridge fully loaded into loading chamber 22. The film cartridge has pushed ejector 80 far enough along third ejector guide channel 74 so that third ejector pin 86 has moved into the short end of L-shaped third ejector guide channel 74. In other words, the rotational force of ejector spring 81 on ejector 80 urged ejector 80 to pivot about first ejector pin 82 (hidden from view), causing third ejector pin 86 to move into the short end of L-shaped third ejector guide channel 74. Note that channel 73 is wider than pin 84, thus allowing rotation of ejector 80. When film cartridge 12 has been completely loaded into chamber 22 and the user is no longer pressing on film cartridge 12, no movement of ejector 80 occurs because third ejector pin 86 is held in a locked position in the short end of L-shaped third ejector guide channel 74. Note also that pin 88 on ejector 80 is adjacent an ejector engaging surface 104 of lever 40. The user next closes film door 42 as shown in FIG. 7, and door release 30 moves to the latched (closed) position, partially covering door 42 to assist in securing door 42 closed, under the urging of lever spring 41 which pulls on lever 40.

The following steps occur when the user decides to remove a film cartridge 12 from the loading chamber. Generally, the steps to unload film cartridge 12 from camera 10 can be summarized as (1) closing the cartridge light-lock door; (2) opening film door 42; (3) triggering the cartridge ejector mechanism; and (4) ejecting the film cartridge. When film has been rewound into film cartridge 12 and the user wants to unload the camera 10, the related components initially appear as shown in FIG. 7. Notice that door release 30 is in the latched (closed) position and ejector 80 is set and locked. The user next moves door release 30 in the direction of arrow A from the latched (closed) position towards the unlatched (open) position. As in the loading process, first pin 26 (hidden from view) pulls lever 40, causing it to rotate clockwise about lever pivot 29. As lever 40 rotates, pawl 64 rotates drive sector 50, which in turn rotates spindle 60 to close the cartridge light lock door. After the light lock door of film cartridge 12 has been closed, the film door 42 opens and lever 40 continues to rotate until ejector engaging surface 104 engages fourth ejector pin 88 on ejector 80. Additional movement of door release 30 towards an eject (third) position (FIG. 8) rotates lever 40 to cause ejector 80 to rotate counter-clockwise about first ejector pin 82 (hidden from view) until third ejector pin 86 disengages from the short end of L-shaped third ejector guide channel 74. Ejector spring 81 next urges ejector 80 along the long end of L-shaped third ejector guide channel 74. As ejector 80 moves along third ejector guide channel 74, second ejector pin 84 pushes film cartridge 12 at least part way out of loading chamber 22, completing the cartridge ejection process. FIG. 5 and FIG. 4 show the film cartridge partially and fully ejected.

Figure 8:
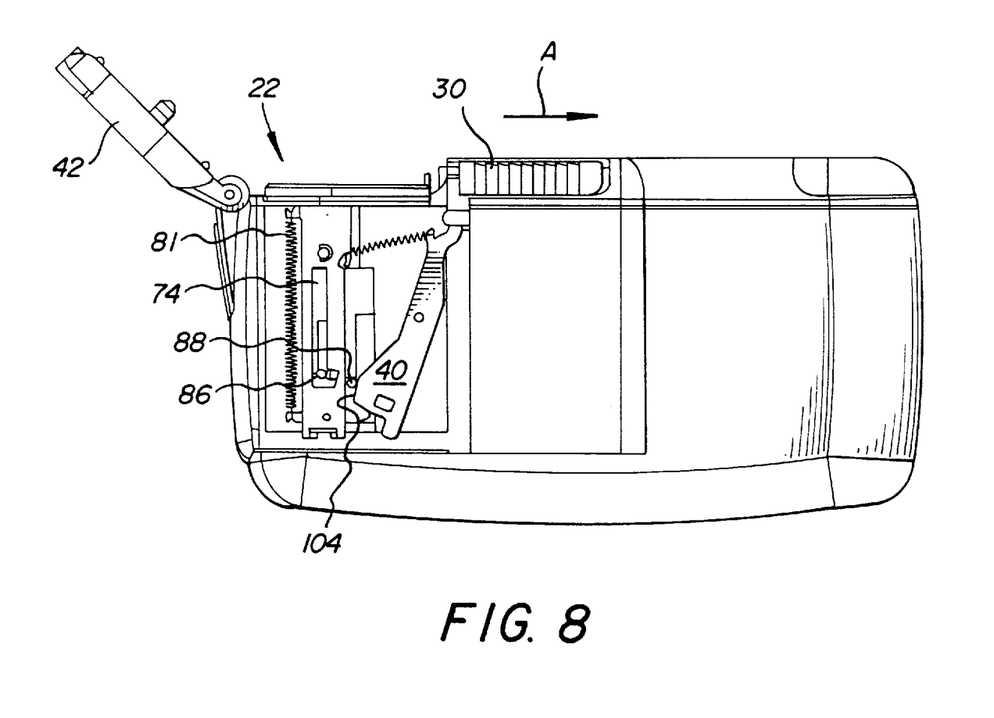

The user may load a film cartridge 12 in loading chamber 22 and then decide to use a different film cartridge 12 than the one just loaded. The present invention allows the user to eject an already loaded film cartridge 12 before closing the film door 14. FIG. 6 shows a film cartridge 12 loaded into chamber 22. Film door 42 has not yet been closed. Door release 30 and lever 40 are in an intermediate detent position. To eject film cartridge 12 from chamber 22, the user moves door release 30 in the direction of arrow A from the intermediate detent position shown in FIG. 6 towards the eject position (FIG. 8). As described in previous paragraphs, as door release 30 moves toward the eject position, lever 40 rotates and ejector engaging surface 104 pushes fourth ejector pin 88 until third ejector pin 86 disengages the short end of L-shaped third ejector guide channel 74. When third ejector pin 86 disengages the short end of L-shaped third ejector guide channel 74, ejector spring 81 pulls ejector 80 toward the long end of L-shaped third ejector guide channel 74 and second ejector pin 84 ejects film cartridge 12 out of chamber 22.

It should be pointed out that door release 30 has a number of positions and controls multiple camera functions. In a latch position shown in FIG. 7, door release 30 is all the way to the left and assists in securing door 42 closed. As the door release is moved to the right towards a detent position (FIG. 6), it causes a cartridge light lock door to be closed. After the light lock door is closed, door release 30 is moved further to the right to reach the unlatch position (intermediate the positions shown in FIGS. 6 and 8) and door 42 is released to open. When the camera user lets go of the door release, door release 30 returns to a detent position shown in FIG. 4. Finally, when the door release is moved furthest to the right to an eject position as shown in FIG. 8, the ejector mechanism is actuated to eject the film cartridge from the loading chamber.

Figure 9:
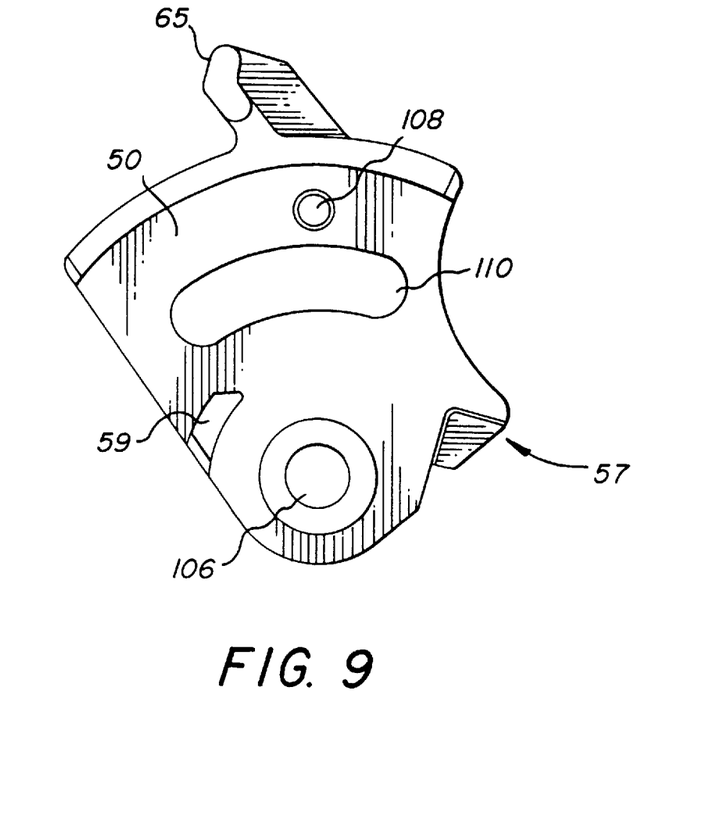
FIG. 9 is a schematic end view of the drive sector 50 of FIG. 1.

Turning now to FIGS. 9–14, operation of a light-lock drive mechanism, including spindle 60 and drive sector 50, to move a cartridge light lock door between its open and closed positions will be described. FIG. 9 shows an inner surface view (not visible in FIG. 1) of drive sector 50 which includes lever engaging surface 65 and a pivot aperture 106 which engages pivot 71 on camera body 20. Drive sector 50 also has a first sector pin 108 and a sector stop 59 protruding from its inner surface, and a sector guide channel (aperture) 110.

Figure 10:
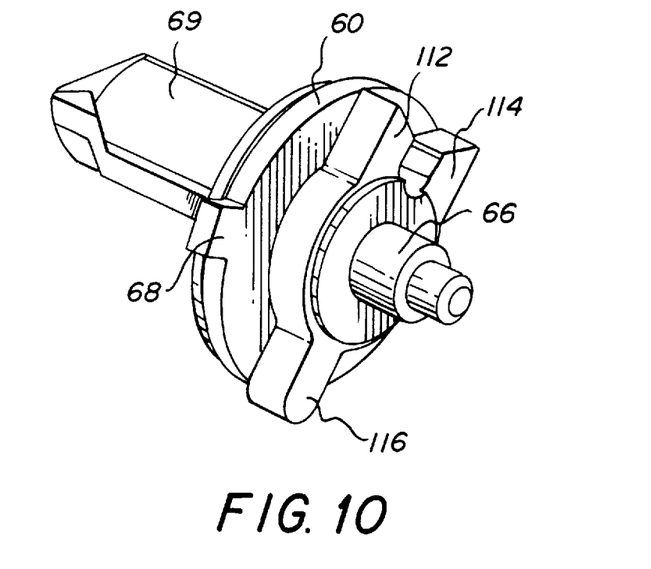
FIG. 10 is a perspective view of the spindle 60 of FIG. 1.

As shown in FIG. 10, spindle 60 includes a lead end 69 for engaging the cartridge light lock as well as first and second spindle arms (112 and 114 respectively) and a spindle lock arm 116. A spindle guide (extension) 66 rides within the sector guide channel 110 of drive sector 50. A spindle rotation stop 68 is located, after assembly, within first aperture 23 of body 20 where it moves between spindle rotation limit surfaces 23A and 23B (see FIG. 1).

FIGS. 11 through 14 show the several stages of the process whereby the light lock door of the film cartridge is closed. When the camera user moves door release 30 from a latched towards an unlatched position, pawl 64 of lever 40 pushes against lever engaging surface 65 of drive sector 50, thus rotating drive sector 50 from a light-lock door open position toward a light-lock door closed position.

Figure 11:
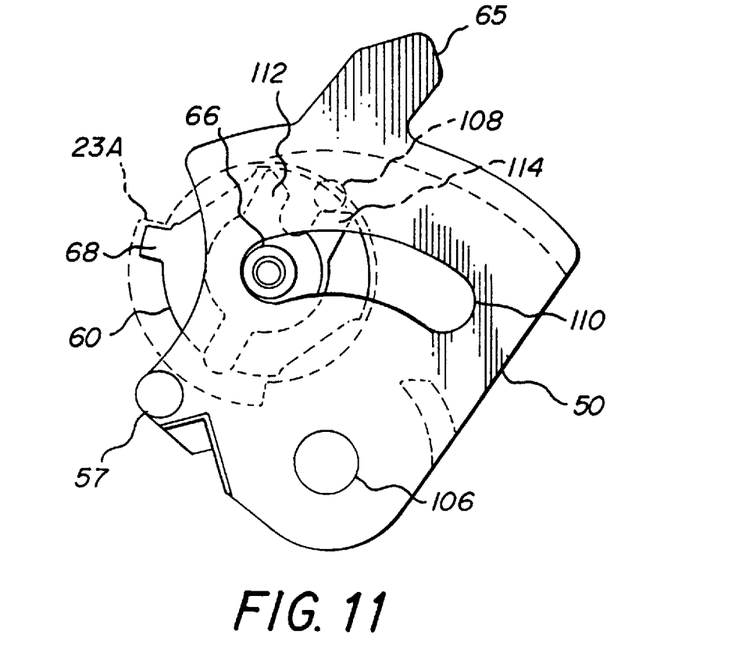
FIGS. 11–14 are schematic end views of the various stages of engagement of spindle 60 and drive sector 50 during cartridge light lock opening and closing.

FIG. 11 shows the light lock drive mechanism in the light lock door open position. In this position, first sector pin 108 is adjacent second spindle arm 114. Spindle guide 66 engages an end of sector guide channel 110 and spindle rotation stop 68 is adjacent to first spindle rotation limit surface 23A.

Figure 12:
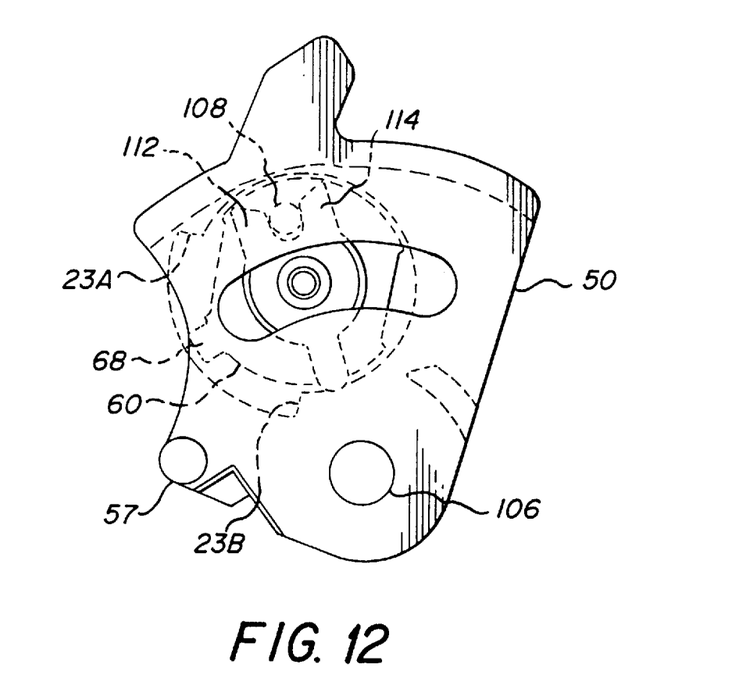

As the user moves door release 30 and lever 40 in the direction of arrow A (FIG. 6), drive sector 50 rotates counterclockwise (CCW) about pivot aperture 106. This rotary motion brings first sector pin 108 between first and second spindle arms 112, 114 as shown in FIG. 12. Further CCW rotation of drive sector 50 causes first sector pin 108 to rotate drive spindle 60 in a CCW direction. FIG. 12 shows the light lock drive mechanism part way between the light lock door open position and the light lock door closed position. Spindle rotation stop 68 is in between spindle rotation limit surfaces 23A and 23B. Notice that drive spindle 60 rotates at a faster rate than drive sector 50.

Figure 13:
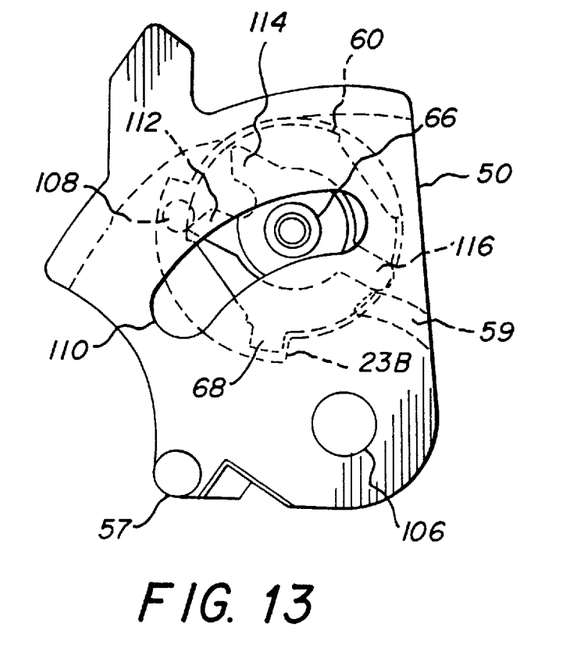

FIG. 13 shows the light lock drive mechanism when it has moved further CCW toward the light lock door closed position. First sector pin 108 has now moved out of spindle arms 112, 114 and spindle rotation stop 68 is adjacent to second spindle rotation limit surface 23B. Sector stop 59 has engaged spindle lock arm 116. At this point, drive spindle 60 can no longer rotate CCW because spindle rotation stop 68 is against second spindle rotation limit surface 23B, and drive spindle 60 cannot rotate CW because sector stop 59 has engaged spindle lock arm 116. This effectively locks the light lock door in the film cartridge closed. Notice however that drive sector 50 can still rotate CCW because spindle guide 66 has not yet engaged the other end of sector guide channel 110.

Figure 14:
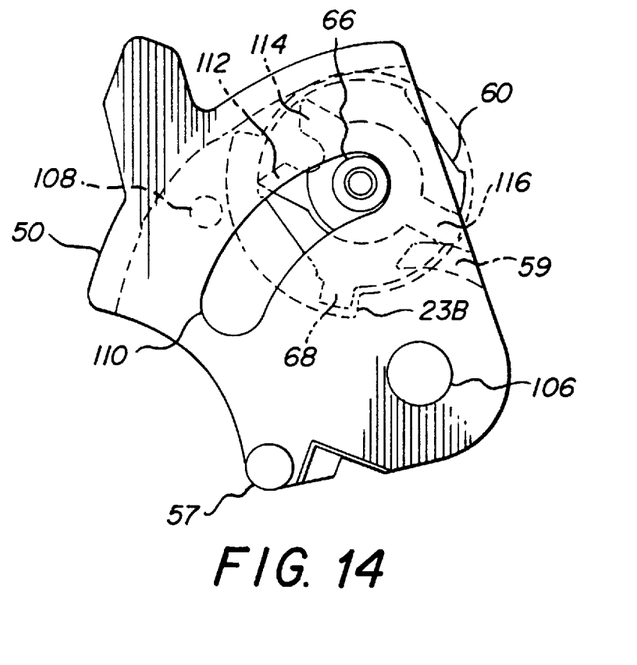

FIG. 14 shows the light lock drive mechanism in the light lock door closed position. Drive sector 50 has rotated fully CCW so that spindle guide 66 now engages the other end of sector guide channel 110, stopping further movement. The reason the drive sector is allowed to rotate further CCW after the spindle stops rotating is to allow lever 40 and door release 30 to continue to be moved to unlatch door 42 and actuate ejector 80.

The use of spindle 60 and drive sector 50 provides a simple design that enables both intermittent motion and locking of the spindle. The small pressure angles that exist between first sector pin 108 and the contact surfaces of spindle arms 112, 114 prevent high contact forces from occurring, which provides for smooth operation. Mechanical locking of the light lock drive mechanism when in the open and closed positions prevents premature movement of the light lock.

When a film cartridge is loaded into loading chamber 22, the light-lock door of the film cartridge is closed and the light-lock drive mechanism of the camera is in a closed position as shown in FIG. 14. Once film door 42 is closed, a camera initialization sequence begins. A portion of this camera initialization sequence opens the cartridge light lock door as follows.

A first implementation of the drive mechanism for opening the cartridge light lock door includes a motor and drive train (not shown). One example of this drive train is detailed in U.S. patent application Ser. No. 08/443,648 filed May 18, 1995, now U.S. Pat. No. 5,555,057 which is incorporated herein by reference (the '648 application). A portion of the drive train engages a cartridge drive spindle 118 (FIG. 1) for rotating spindle 118 to both thrust film out of a film cartridge and rewind film back into the film cartridge. After a film cartridge is loaded and door 42 is closed, spindle 118 is briefly rotated in a counter-clockwise (rewind) direction (as seen in FIG. 1). As a result, a cam feature (not shown) on spindle 118 engages a pin 57 (see FIGS. 1, 9 and 11) on drive sector 50 to rotate the drive sector clockwise and open the cartridge light lock. After the light lock is opened, spindle 118 is rotated clockwise in a thrust direction to thrust film out of the cartridge.

As drive sector 50 rotates CW, first sector pin 108 engages first spindle arm 112 (FIG. 13) and moves between first and second spindle arms 112, 114 (FIG. 12). This causes drive spindle 60 to also rotate CW. Continued CW rotation of drive sector 50 eventually causes first sector pin 108 to rotate drive spindle 60 to an open position (FIG. 11). FIG. 11 shows first sector pin 108 positioned in contact with only the second spindle arm 114. As shown in FIG. 11, the CW rotation of drive sector 50 stops when spindle guide 66 engages one end of sector guide channel 110. Sector spring 51 applies sufficient force to urge drive sector 50 CW to prevent CCW rotation of drive sector 50 after the door is open.

Notice that drive spindle 60 is locked in the open position by first sector pin 108 being in contact with spindle arm 114 and by spindle rotation stop 68 engaging first spindle rotation limit surface 23A.

A second implementation of the drive mechanism for opening the cartridge light lock utilizes a sector spring 51 capable of providing sufficient force to urge drive sector 50 in a CW direction to an open position. Thus the cartridge light lock door is opened by allowing sector spring 51 to move drive sector 50 from a closed position as shown in FIG. 13 to an open position as shown in FIG. 11. This method requires a sector spring 51 that can provide sufficient force to move the light lock drive mechanism and the cartridge light lock door.

Yet another alternative implementation of the drive mechanism for opening the cartridge light lock door combines the sector spring 51 of the second implementation with the first implementation which utilizes the drive train for moving film. This third implementation reduces the force that the drive train must deliver to drive sector 50 because some of the force is provided by sector spring 51. In a further implementation, as disclosed in the '648 application, a sector gear on drive spindle 60 is engaged by a gear of the film drive gear train in order to open the cartridge light lock door.

The invention has been described with reference to a preferred embodiment. However, it will be appreciated that variations and modifications can be effected by a person of ordinary skill in the art without departing from the scope of the invention.

We claim:

1. A camera comprising a camera body and a chamber for receiving a film cartridge having a light-lock rotatable between open and closed positions, is characterized by:

a light-lock drive mechanism for rotating the light-lock between the open and closed positions, said drive mechanism including a spindle which engages the light lock, the spindle including a rotation stop which is engageable with a surface of the camera body to limit rotation of the spindle in a first direction;

wherein said rotation stop is engageable with an additional surface of the camera body to limit rotation of the spindle in a second direction;

and wherein said drive mechanism further includes a drive member engageable with the spindle to rotate the spindle, said drive member including a pin that is engageable with an arm of the spindle which, in combination with said rotation stop engaging said surface of the camera body, locks the spindle in an open position.

2. The camera of claim 1, wherein said drive member includes a sector stop and said spindle includes a lock arm engageable with the sector stop when the rotation stop engages said additional surface of the camera body to lock the spindle in a closed position.

3. The camera of claim 1 wherein when said spindle is in a closed position, said drive member can be further moved to disengage said pin from said spindle.

4. The camera of claim 1, wherein said drive member includes an aperture into which an extension of said spindle extends, interaction of said extension with an aperture side limiting movement of said drive member.

* * * * *